(12) United States Patent
Chew

(10) Patent No.: US 11,390,961 B2
(45) Date of Patent: Jul. 19, 2022

(54) SYSTEM AND METHOD FOR PREVENTION OF ADHESION OF MARINE ORGANISMS TO A SUBSTRATE CONTACTING WITH SEAWATER

(71) Applicant: Sembcorp Marine Repairs & Upgrades Pte. Ltd., Singapore (SG)

(72) Inventor: Hwee Hong Chew, Singapore (SG)

(73) Assignee: Sembcorp Marine Repairs & Upgrades Pte. Ltd., Singapore (SG)

(*) Notice: Subject to any disclaimer, the term of this patent is extended or adjusted under 35 U.S.C. 154(b) by 0 days.

(21) Appl. No.: 15/187,998

(22) Filed: Jun. 21, 2016

(65) Prior Publication Data
US 2016/0298257 A1      Oct. 13, 2016

Related U.S. Application Data

(62) Division of application No. 13/394,882, filed as application No. PCT/CN2009/073799 on Sep. 8, 2009, now abandoned.

(51) Int. Cl.
| C25F 1/00 | (2006.01) |
| B63B 59/04 | (2006.01) |

(Continued)

(52) U.S. Cl.
CPC .............. C25F 1/00 (2013.01); B63B 59/04 (2013.01); C02F 1/48 (2013.01); C25F 7/00 (2013.01);

(Continued)

(58) Field of Classification Search
CPC .......... C02F 2201/486; C02F 2201/483; C02F 2201/48; C02F 2201/00; C02F 1/487; C02F 1/48; C02F 1/00; B63B 59/04; C25F 1/00
See application file for complete search history.

(56) References Cited

U.S. PATENT DOCUMENTS

| 4,667,705 A | 5/1987 | Nijhuis |
| 5,074,998 A * | 12/1991 | De Baat Doelman .. C02F 1/485 |
| | | 210/222 |

(Continued)

FOREIGN PATENT DOCUMENTS

| CN | 1358149 A | 7/2002 |
| JP | 2004183018 A | 7/2004 |
| WO | 2004071863 A1 | 8/2004 |

OTHER PUBLICATIONS

Electronics Tutorial ("Transformer Basics", 2012) (Year: 2012).*
Uiversity of Texas ("Voltaic Cells", 2013). (Year: 2013).*

*Primary Examiner* — Alexander W Keeling
(74) *Attorney, Agent, or Firm* — Cesari & McKenna, LLP

(57) ABSTRACT

A system and a method for prevention of adhesion of marine organisms to a substrate contacted with seawater are provided. The system comprises a generator (120, 220) for producing an electrical signal (150) operating in desirable frequencies in which the marine organisms can be chased or killed, said generator (120, 220) having at least two output connectors (122, 124, 222, 224), means for oscillating and propagating the electrical signal (150) along a surface of the substrate, said means being adapted to make electrical connection with the at least two output connectors (122, 124, 222, 224) of the generator (120, 220) and being submerged in seawater, and an electric power source (110, 210) connected to the generator (122, 124, 222, 224) for applying a selected voltage to the generator (122, 124, 222, 224) to produce the electrical signal (150).

7 Claims, 5 Drawing Sheets

(51) Int. Cl.
*C02F 1/48* (2006.01)
*C25F 7/00* (2006.01)

(52) U.S. Cl.
CPC .. *C02F 2201/483* (2013.01); *C02F 2201/486* (2013.01); *C02F 2303/20* (2013.01)

(56) References Cited

U.S. PATENT DOCUMENTS

| | | | | |
|---|---|---|---|---|
| 5,756,051 | A | * | 5/1998 | Overton ................ C02F 1/008 422/105 |
| 6,209,472 | B1 | | 4/2001 | Staerzl |
| 6,973,890 | B1 | | 12/2005 | Staerzl |
| 7,025,013 | B1 | * | 4/2006 | Staerzl ................... B63B 59/04 114/222 |
| 7,033,481 | B1 | * | 4/2006 | Schlager ................ C02F 1/008 204/228.3 |
| 2004/0238453 | A1 | * | 12/2004 | Cho ......................... C02F 1/48 210/702 |
| 2005/0073466 | A1 | | 4/2005 | Karlsen |
| 2006/0185781 | A1 | | 8/2006 | McLaughlin |
| 2007/0029261 | A1 | * | 2/2007 | Chew ...................... C02F 1/48 210/695 |
| 2009/0038944 | A1 | * | 2/2009 | Kruger ................ C02F 1/4602 204/555 |
| 2010/0101958 | A1 | * | 4/2010 | Holland ................ C02F 1/487 204/557 |
| 2010/0181261 | A1 | * | 7/2010 | Taylor ...................... C02F 1/48 210/748.17 |

\* cited by examiner

SYSTEM AND METHOD FOR PREVENTION OF ADHESION OF MARINE ORGANISMS TO A SUBSTRATE CONTACTING WITH SEAWATER

CROSS-REFERENCE TO RELATED APPLICATION(S)

This application is a divisional of U.S. patent application Ser. No. 13/394,882, filed on May 2, 2012, now abandoned, which is a national phase entry of PCT/CN09/73799 filed Sep. 8, 2009, the disclosures of which are hereby incorporated herein by reference in their entireties.

FIELD OF THE INVENTION

This invention relates generally to the field of prevention of marine organisms from attaching themselves to a substrate exposed to seawater, and more particularly, to system and method for prevention of adhesion of marine organisms to a substrate, such as ships' hulls, marine vessels, pipelines, contacting with seawater by use of an electrical signal operating with high frequencies.

BACKGROUND OF THE INVENTION

Biofouling or biological fouling is the undesirable settling, attaching and growing of microorganisms, plants, algae and/or animals on submerged marine surfaces. The biofouling of submerged marine surfaces by marine organisms is a well-know problem. If the accumulation of marine growth on the ships, it can drastically reduce the ship's speed, increase fuel consumption, and clog up the seawater cooling, ballast systems or any seawater intake and discharge lines. Apart from the ship applications, biofouling control is also necessary for seawater cooling systems such as power station seawater cooling water intake and condenser cooling systems. Another problem associated with the biofouling is that the marine organisms which are native to one water area would be transported to other areas along with the travelling of the ship, which inevitably influences the biological system of the other areas.

In addition to the biofouling attachment, in many industrial plant installations, it is necessary to prevent the intrusion of marine organisms into the seawater cooling system. For examples, the massive shrimps intrusion into the power plant cooling system can possibly choke up the filter screens or gates and cause shutdown of the plant.

Various methods have been developed to tackle the above problem, in order to remove the accumulation or prevent the accumulation of the marine organisms. One of these methods is the use of bio-dispersants to control the biofouling. Another method, which is the most commonly used in the art, is to apply paints or some other type of coatings onto the submerged substrates, in an attempt to control or prevent attachment of unwanted organisms. However, most of the paints or coatings have been found to be toxic to marine organisms, and may be released slowly from the submerged substrates into the sea water and persist in the water, killing sealife, harming the environment and possibly entering the food chain. One of the most effective anti-fouling paints, tributyltin (TBT) even at an extremely low concentration, has been proven to cause deformations in oysters and sex changes in whelks. Therefore, use of these types of paints or coatings has caused damage to the marine ecosystem, because of their accumulation in water. As such, International Marine Organization (IMO) has recommended that measures should be adopted to eliminate the use of anti-fouling paints or coatings including organtins containing TBT or triphenyltin (TPT).

It has been always a major challenge to develop alternative technologies for the anti-fouling paints or coatings, in order to prevent fouling on the submerged substrates such as ship's hulls. To this end, copper and derivative compounds have been successfully been developed, which are used in the paints though there is still debate as to the safety of copper.

Thus, there is a need for a device and a method for prevention of adhesion of marine organisms to a substrate submerged in seawater, which is constructively very simple, relatively inexpensive and more environmentally sound without leaching toxins, irrespective of whether the substrate is stationary or moving, however, allows an efficient control or prevent attachment of unwanted organisms.

SUMMARY OF THE PRESENT INVENTION

The present invention has been developed to fulfill the needs noted above and therefore has a principle object of the provision of a system for prevention of adhesion of marine organisms to a substrate contacting with seawater which is environmentally sound and does not leach toxins into the water.

Another object of the invention is to provide a system for prevention of adhesion of marine organisms to a substrate contacting with seawater which is significantly more economical and convenient to utilize.

A yet further object of the invention is to provide a system for prevention of adhesion of marine organisms to a substrate contacting with seawater which allows an efficient control or prevent attachment of unwanted organisms.

These and other objects and advantages of the invention are satisfied by providing a system for prevention of adhesion of marine organisms to a substrate contacting with seawater, comprising:

a generator for producing an electrical signal operating with desirable frequencies which are able to chase or kill the marine organisms, said generator having at least two output connectors;

means for oscillating and propagating the electrical signal along a surface of the substrate, said means being adapted to make electrical connection with the at least two output connectors of the generator and being submerged in water; and an electric power source connected to the generator for applying a selected voltage to the generator to produce the electrical signal.

In one preferred embodiment, the generator comprises a card console and a plurality of transistors connected to the card console to produce the electrical signal having the frequencies in square wave form.

In one particularly preferred embodiment, the means for oscillating and propagating the electrical signal comprises at least two spaced electrode antennas between which the electrical signal oscillates and propagates, each of the electrode antennas being adapted to make electrical connection with the respective output connectors of the generator. The frequencies generated by the generator vary in the range of 5 kHz to 200 kHz, preferably in the ranger of 5 kHz to 50 kHz, and more preferably in the range of 10 kHz to 15 kHz, of 15 kHz to 20 kHz, or of 5 kH to 10 kHz to 20 kHz.

A variant of the means for oscillating and propagating the electrical signal comprises a plurality of spaced electrode antennas which are arranged in an array configuration, and the array configuration having two ends adapted to make electrical connection with the respective output connectors of the generator. For example, the array configuration may be linear or in the form of a matrix array.

According to the invention, the electrodes may be made of a metal material or metal oxide, or of graphite.

It would be understood that the shape of the electrode antennas and the arrangement of the array may be varied according to the actual requirements.

Advantageously, the electric power source supplies to the generator a low voltage of 24V, 30V, 36V, 45V or 48V.

In another particularly preferred embodiment, the means for oscillating and propagating the electrical signal comprises an antenna, and a coil wound around the antenna and having two ends adapted to make electrical connection with the respective output connectors of the generator. A housing may be provided, in which the antenna and the coil are disposed. The frequencies generated by the generator vary in the range of 5 kHz to 200 kHz, preferably in the range of 5 kHz to 30 kHz.

According to the invention, the antenna may be formed as a ferrite core, or made of a hollow non-metallic tube. Another aspect of the invention is to provide a method for prevention of adhesion of marine organisms to a substrate contacting with seawater, comprising the steps of:

providing a generator for producing an electrical signal operating with desirable frequencies which are able to chase or kill the marine organisms, said generator having at least two output connectors;

providing means for oscillating and propagating the electrical signal, and disposing the means along a surface of the substrate to be submerged in water, said means being adapted to make electrical connection with the at least two output connectors of the generator; and connecting the generator to an electric power source for applying a selected voltage thereto in order to produce the electrical signal.

In one embodiment of the invention, the step of providing the means for oscillating and propagating the electrical signal comprises providing at least two spaced electrode antennas between which the electrical signal propagates, each of the electrode antennas being adapted to make electrical connection with the respective output connectors of the generator, wherein the generator produces the electrical signal operating with frequencies in the range of 5 kHz to 200 kHz.

In a yet embodiment of the invention, the step of providing the means for oscillating and propagating the electrical signal comprises providing an antenna, and a coil wound around the antenna and having two ends adapted to make electrical connection with the respective output connectors of the generator, wherein the generator produces the electrical signal operating with frequencies in the range of 5 kHz to 200 kHz.

To have a better understanding of the invention reference is made to the following detailed description of the invention and embodiments thereof in conjunction with the accompanying drawings.

DETAILED DESCRIPTION OF THE PREFERRED EMBODIMENTS

While this invention is illustrated and described in preferred embodiments, the system for prevention of adhesion of marine organisms to a substrate contacting with seawater may be produced in many different configurations, sizes, forms and materials.

Figure 1:
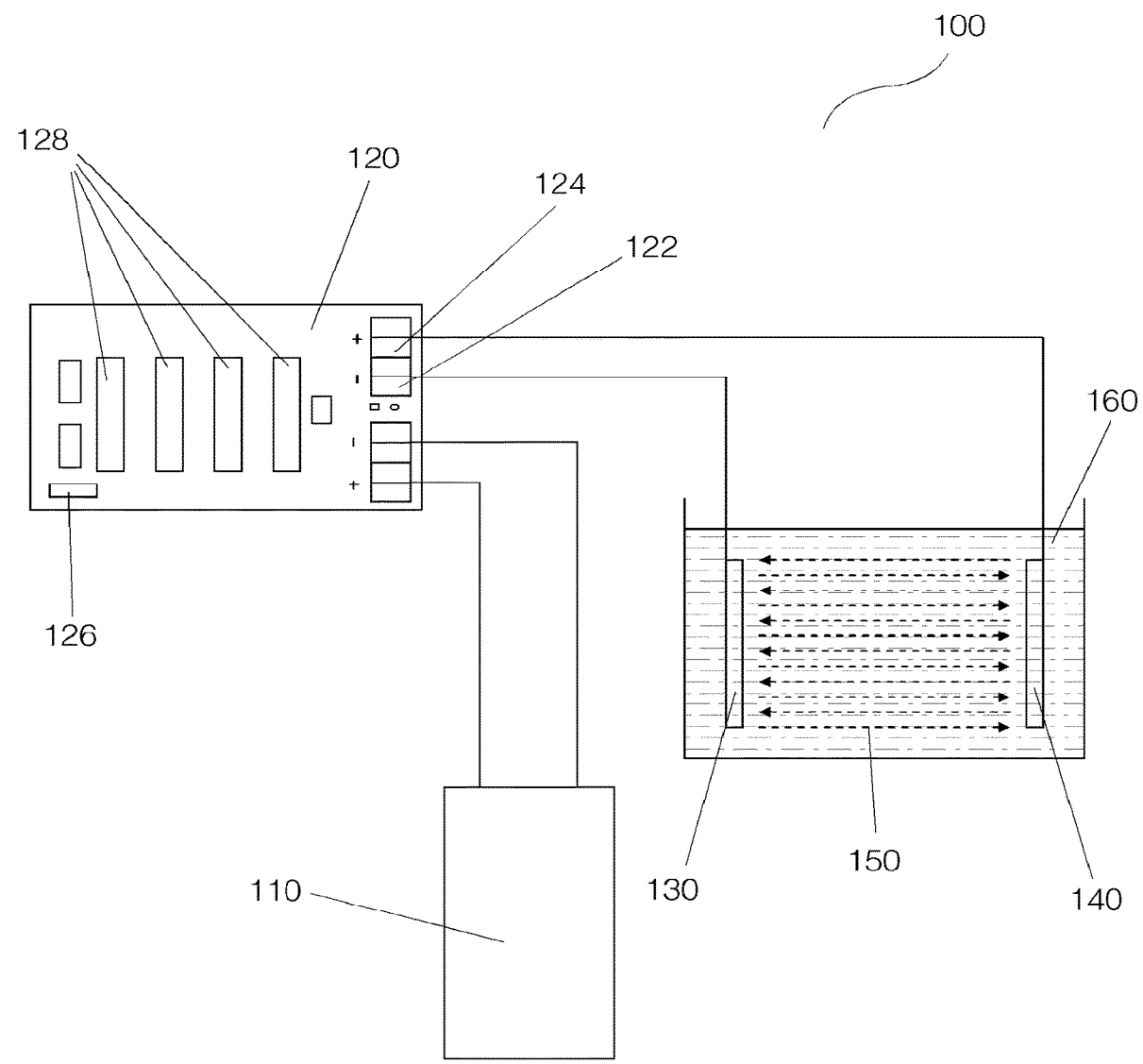
FIG. 1 is a schematic view of a system for prevention of adhesion of marine organisms to a substrate contacting with seawater, which is constructed in accordance with a first embodiment of the invention.

Referring now to the drawings, FIG. 1 provides a system 100 constructed consistent with a first embodiment of the present invention. In this embodiment, the system 100 comprises a power supply unit 110, a generator 120 for producing electrical signals operating with desirable frequencies in square wave form, and means for oscillating and propagating the electrical signals, which means comprises two spaced electrode antennas 130, 140 submerged in water.

The power supply unit 110 is electrically connected to the generator 120. DC (e.g. battery) and AC power supplies can be used in the power supply unit 110. Advantageously, the power supply unit 100 further comprises a rectifier for providing direct current pulse voltage. The power supply unit 110 preferably supplies to the generator a low voltage of 24V, 30V, 36V, 45V or 48V. It would be understood that the higher the voltage is, the stronger the strength outputted by the generator is.

The generator 120 comprises a card console 126 and a plurality of transistors 128 connected to the card console 126 to produce the electrical signals. The generator 120 has two output connectors 122, 124 which are in electrical connection with the electrode antennas 130, 140, respectively. The card console 126 has a variety of ranges of frequency, which all fall into the scope of desirable frequencies. In this embodiment, the desirable frequencies are in the range of 5 kHz to 200 kHz, preferably in the range of 5 kHz to 50 kHz, particularly in the range of 10 kHz to 15 kHz, of 15 kHz to 20 kHz, or of 5 kH to 10 kHz to 20 kHz. For example, a spike card having a frequency at 5 kHz, 10 kHz and 20 kHz, a trapping card having a frequency at 10 kHz and a normal card having a frequency ranging from 10 kHz to 15 kHz can be used in the generator 120. The output current of the card console 126 depends on the voltage of the power supply applied to the generator 120. The system 100 consumes low voltage and low current.

The electrode antennas 130, 140 are disposed to be submerged in seawater 160 in a spaced apart relation, and electrically connected to the respective output connectors 122, 124 of the generator 120, allowing the electrical signals produced by the generator 120 to oscillate and propagate between the two electrode antennas 130, 140 via ions and molecules in water. Advantageously, the electrode antennas 130, 140 are spaced apart such that the electrical signals 150 operating with the frequencies in the range of 5 kHz to 50 kHz, which oscillate and propagate between the two electrode antennas 130, 140 are strong sufficiently to repel, chase and kill any marine organisms. The electrical field with the frequencies ranging from 5 kHz to 200 kHz would penetrate and destroy the nervous systems, muscle control systems, sensing systems of marine organisms and planktons, thus providing the protection for the area between the two electrode antennas.

The electrode antennas can be made of a metal material, such as silver, copper, iron, or metal oxide. Graphite is preferred for the electrode antennas because it has a low consumption rate in seawater and can be controlled not to produce chlorine gas in the system. Therefore, in this embodiment, the electrode antennas are made of graphite because of its inert characteristics in seawater.

As discussed above, the generator 120 produces electrical signals within the range of 5 kHz to 200 kHz, which signals are continuously transmitted to the area defined by the two electrode antennas 130, 140, and then oscillating and propagating within this area. The strength of the electrical field in this area depends on the current outputted from the card console 126, the frequencies produced by the generator 120, the voltage of the power supply and the distance between the two electrode antennas 130, 140. For example, in the case that the voltage of the power supply is 48V, the input DC current of the power supply is 0.87 A, the input DC current of the card console is 4.5 A, the output DC current of the card console is 5.1 A, then the electrical field between the electrode antennas 130, 140 would be strong enough to chase and kill any living organisms in seawater. The two electrode antennas may be spaced apart to be, for example, within 1 m or even more, which depends on the strength of the electrical field, the water condition in use, and the actual installation of the system.

Figure 2:
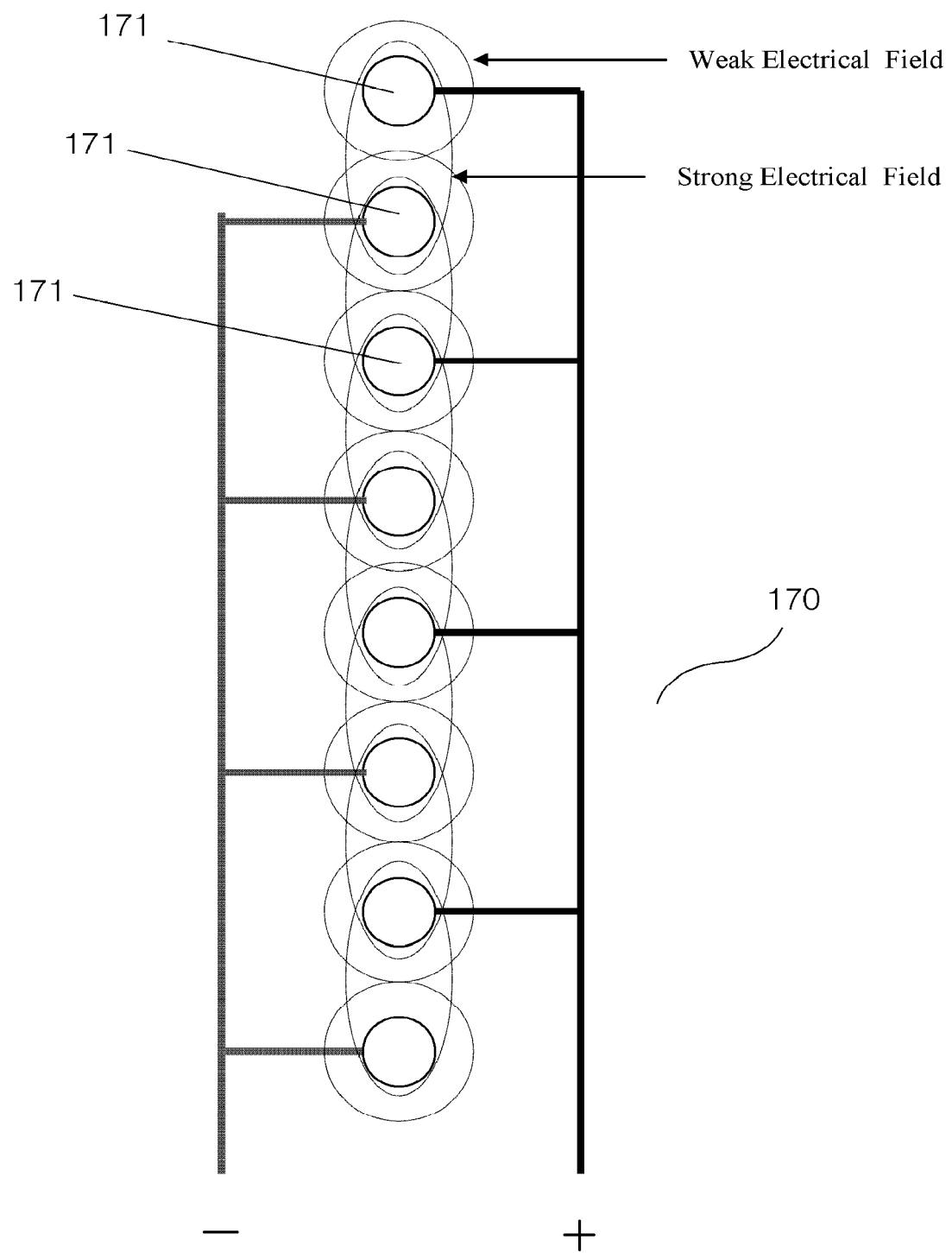
FIG. 2 is a schematic top view of a first variant of the means for oscillating and propagating the electrical signal as shown in FIG. 1, which is a linear array.
Figure 3:
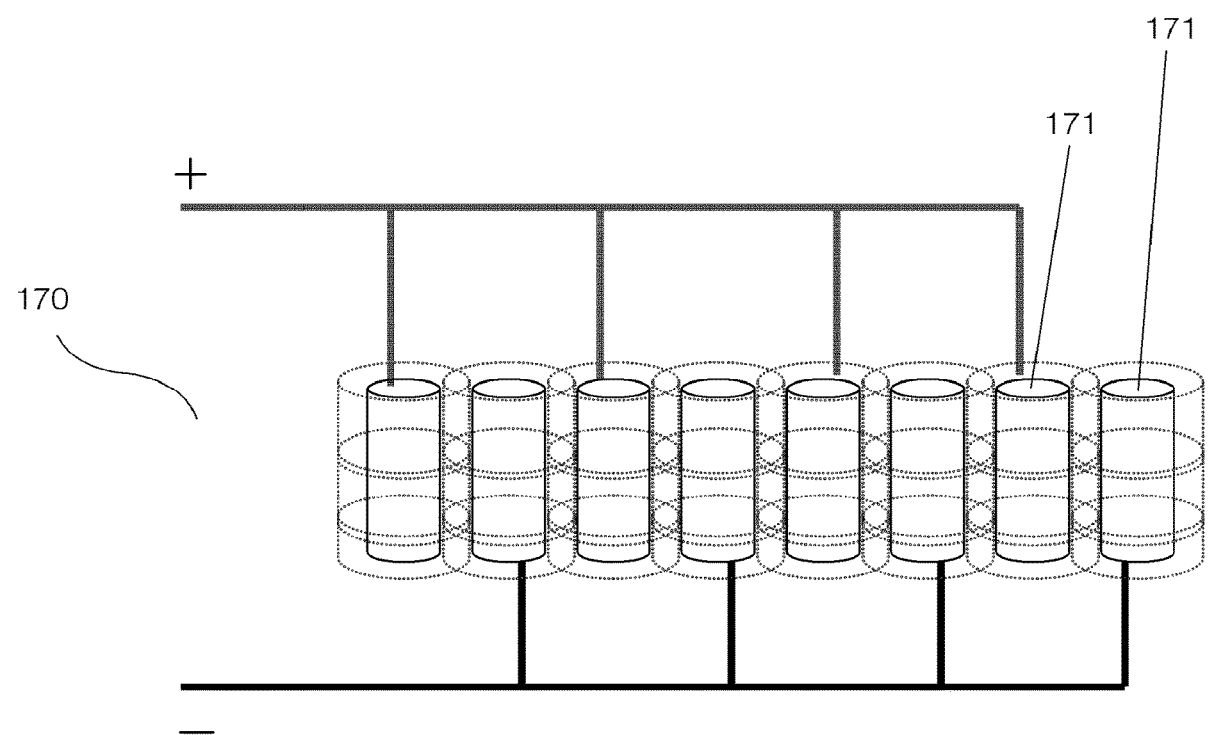
FIG. 3 is a schematic side view of the variant of FIG. 2.
Figure 4:
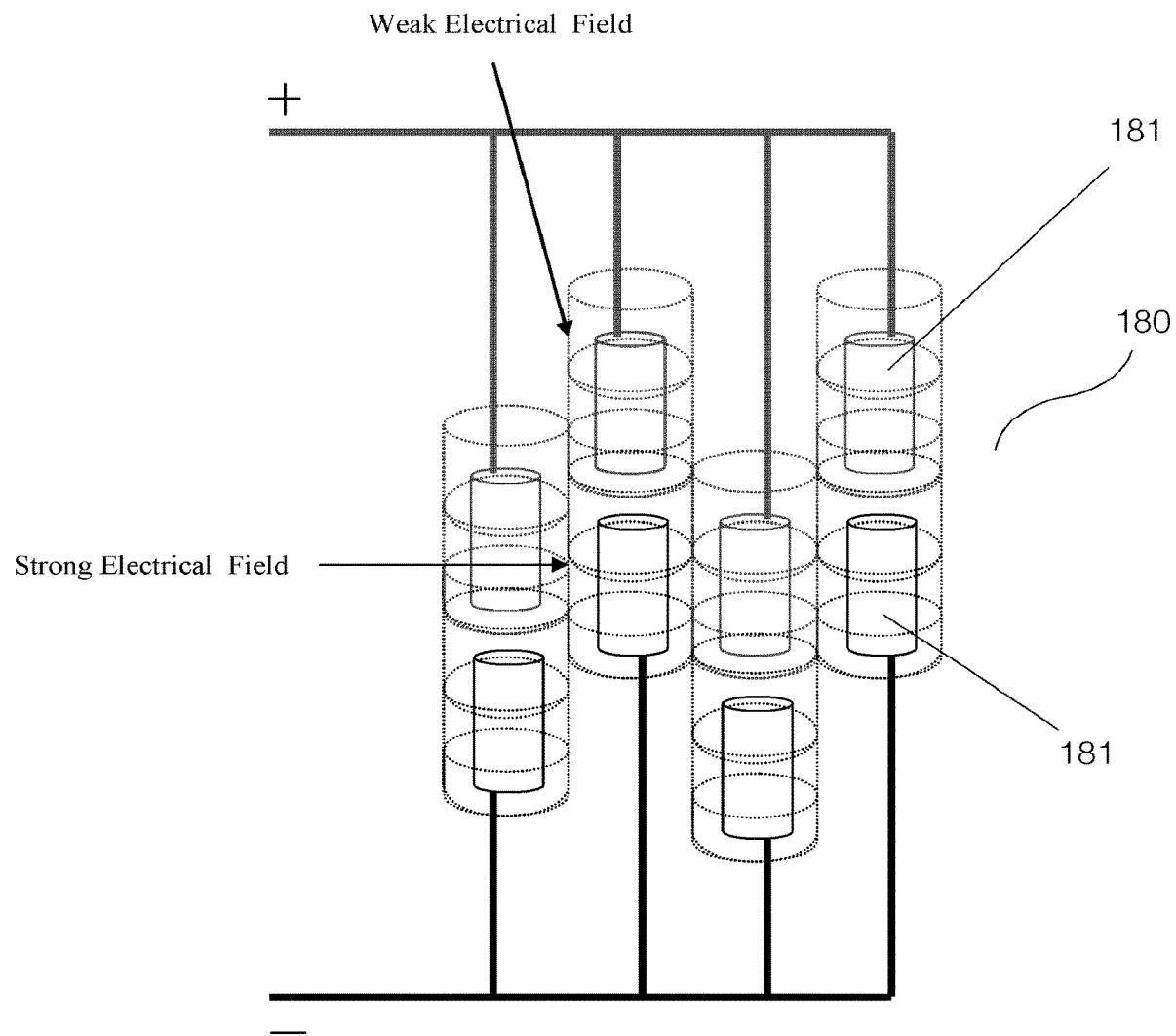
FIG. 4 is a schematic view of a second variant of the means for oscillating and propagating the electrical signal as shown in FIG. 1, which is in the form of a matrix array.

FIGS. 2 to 4 illustrate first and second exemplary variants of the means for oscillating and propagating the electrical signal as shown in FIG. 1. In particular, these variants are formed in an array configuration.

In FIGS. 2 and 3, the array configuration comprises a plurality of spaced electrode antennas 171, which is a linear array 170. The alternate antennas 171 in the linear array 170 are in parallel connection and then electrically connected to the respective output connectors 122, 124 of the generator 120, allowing the electrical signals produced by the generator 120 to oscillate and propagate among the antennas 171 in the array 170. As illustrated, the area where the electrical fields from the adjacent antennas 171 overlaps produces the stronger electrical signals.

In FIG. 4, the array configuration also comprises a plurality of spaced electrode antennas 181, which is in the form of matrix array 180. The electrode antennas 181 at each side of this matrix array 180 are in parallel connection and then electrically connected to the respective output connectors 122, 124 of the generator 120, allowing the electrical signals produced by the generator 120 to oscillate and propagate among the antennas 181 in the array 180. Like the first array configuration above, the area where the electrical fields from the adjacent antennas 181 overlaps produces the stronger electrical signals.

It would be appreciated that in operation, the adjacent electrode antennas in the array may be spaced apart from each other by a distance which is dependent on the strength of the electrical filed applied, the power supply and the water condition. Actual arrangement of the array configuration may be altered to suit the actual application conditions.

Figure 5:
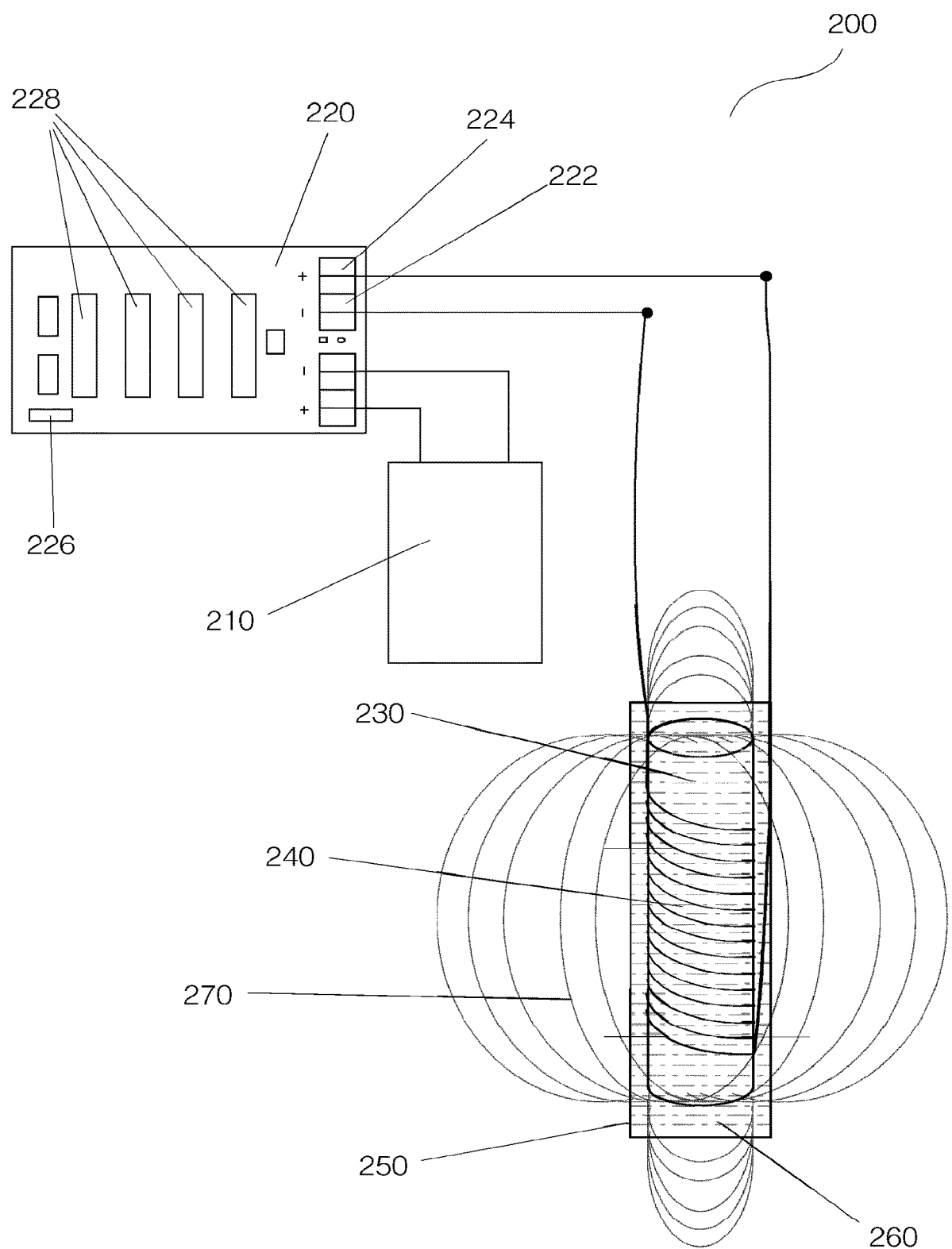
FIG. 5 is a schematic view of a system for prevention of adhesion of marine organisms to a substrate contacting with seawater, which is constructed in accordance with a second embodiment of the invention.

Now referring to FIG. 5, there is illustrated a system 200 constructed consistent with a second embodiment of the present invention. In this embodiment, the system 200 comprises a power supply unit 210, a generator 220 for producing electrical signals operating with desirable frequencies, and means for oscillating and propagating the electrical signals, which means comprises a ferrite core antenna 230 and a coil 240 would around the ferrite core antenna 230 submerged in water.

Like the first embodiment mentioned above, the power supply unit 210 is electrically connected to the generator 220. DC and AC power supplies can be used in the power supply unit 210. The power supply unit 100 may further comprise a rectifier for providing direct current pulse voltage. A low voltage of 24V, 30V, 36V, 45V or 48V is possible for the power supply unit 210.

The generator 220 comprises a card console 226 and a plurality of transistors 228 connected to the card console 226 to produce the electrical signals. The generator 220 has two output connectors 222, 224 which are in electrical connection with respective ends of the coil 240. The card console 226 has a variety of ranges of frequency, which all fall into the scope of desirable frequencies. In this embodiment, the desirable frequencies are in the range of 5 kHz to 200 kHz, preferably in the range of 5 kHz to 30 kHz. The output current of the card console 226 depends on the voltage of the power supply applied to the generator 220.

The ferrite core antenna 230 and the coil 240 are disposed within a housing 250, which are then submerged in seawater 260. The coil 240 has two ends, each of which is electrically connected to the respective output connector 222, 224 of the generator 220, allowing the current to flow therethrough so as to generate electromagnetic waves within the frequencies in the range of 5 kHz to 200 kHz. As shown in FIG. 5, the electromagnetic field 270 is then generated within the coil 240 and around the coil 240, which is able to repel, chase and kill any marine organisms. Any marine organism, which are subjected to the effects of the electromagnetic field generated, can detect electromagnetic wave or field in this range of frequencies, and can be repelled, chased away or killed. Thus, the protection for the area covered by the electromagnetic field 270 is provided.

In addition to the ferrite core antenna, the antenna may be made of any other ferromagnetic material or a hollow non-metallic tube. The antenna can act as a magnet to generate the electromagnetic field when the current flows through the coil. The number of turns of the coil 240 is determined according to the current flow through the wire and according to the actual requirements.

Like the generator 120 discussed above, the generator 220 produces electrical signals within the range of 5 kHz to 200 kHz, which signals are continuously transmitted through the ferrite core antenna 230 to oscillate and propagate electromagnetic signals generated by the electromagnetic field. Low voltage and low current are consumed in this system. The strength of the electromagnetic field depends on the current outputted from the card console 226, the frequencies produced by the generator 220, the voltage of the power supply and the size of the ferrite core antenna 230. For example, in the case that the voltage of the power supply is 48V, the input DC current of the power supply is 0.87 A, the input DC current of the power supply is 1.47 A, the input DC current of the card console is 13 A, and the output DC current of the card console is 4.8 A, then the electromagnetic field generated by the system 200 would be strong enough to chase and kill any living organisms in seawater.

The method of the present invention for prevention of adhesion of marine organisms to a substrate contacting with seawater comprises the steps of providing a generator for producing an electrical signal operating with desirable frequencies which are able to chase or kill the marine organisms, said generator having at least two output connectors;

providing means for oscillating and propagating the electrical signal, and disposing the means along a surface of the substrate to be submerged in water, said means being adapted to make electrical connection with the at least two output connectors of the generator; and connecting the generator to an electric power source for applying a selected voltage thereto in order to produce the electrical signal.

Referring back to FIG. 1, the method of the preferred embodiment comprises providing at least two spaced electrode antennas 130, 140 between which the electrical signal oscillates and propagates, each of the electrode antennas being adapted to make electrical connection with the respective output connectors 122, 124 of the generator 120, wherein the generator 120 produces the electrical signal operating with frequencies in the range of 5 kHz to 200 kHz.

Referring to FIG. 5, the method of the preferred embodiment comprises providing a ferrite core antenna 230, and a coil 240 wound around the ferrite core antenna 230 and having two ends adapted to make electrical connection with the respective output connectors 222, 224 of the generator 220, wherein the generator 220 produces the electrical signal operating with frequencies in the range of 5 kHz to 200 kHz.

The invention thus provides a system and a method for prevention of adhesion of marine organisms to a substrate contacting with seawater which is very simple, relatively inexpensive and more environmentally sound without leaching toxins, and which provides an efficient antifouling result.

While the embodiments described herein are intended as an exemplary wall lamp fixture, it will be appreciated by those skilled in the art that the present invention is not limited to the embodiments illustrated. Those skilled in the art will envision many other possible variations and modifications by means of the skilled person's common knowledge without departing from the scope of the invention, however, such variations and modifications should fall into the scope of this invention.

What is claimed is:

1. A system for prevention of adhesion of marine organisms to a substrate contacting with seawater, comprising:
    a generator for producing an electrical signal operating with frequencies which are able to chase or kill the marine organisms, said generator having a card console and at least two output connectors;
    a plurality of cards each operating with the card console, the plurality of cards including a trapping card to provide a distinct frequency, a spike card to provide a set of distinct frequencies, and a normal card to provide a frequency range for the electrical signal produced by the generator;
    a device for oscillating and propagating the electrical signal along a surface of the substrate, said device being adapted to make electrical connection with the at least two output connectors of the generator and being submerged in water; and
    an electric power source connected to the generator for applying a selected voltage to the generator to produce the electrical signal,
    wherein the device for oscillating and propagating the electrical signal comprises at least one pair of spaced cylindrical electrode antennas, the electrical signal oscillating and propagating through each of the spaced cylindrical electrode antennas along the surface of the substrate, thereby preventing adhesion of the marine organisms to the substrate contacting with seawater, and one of the spaced cylindrical electrode antennas in each of the at least one pair of spaced cylindrical electrode antennas has a single electrical connection, the single electrical connection being electrically connected with only one of the at least two output connectors of the generator and the other of the spaced cylindrical electrode antennas in each of the at least one pair of spaced cylindrical electrode antennas also has a single electrical connection, the single electrical connection being electrically connected with only one of another of the at least two output connectors of the generator.

2. The system as claimed in claim 1, wherein the generator comprises a plurality of transistors connected to the card console to produce the electrical signal having the frequencies in square wave form.

3. The system as claimed in claim 1, wherein the frequencies generated by the generator vary in the range of 5 kHz to 200 kHz.

4. The system as claimed in claim 3, wherein the frequencies are selected in the range of 5 kHz to 50 kHz.

5. The system as claimed in claim 1, wherein the at least one pair of spaced cylindrical electrode antennas is made of a material selected from metal, metal oxide, and graphite.

6. The system as claimed in claim 1, wherein the electric power source supplies to the generator a low voltage of 24V, 30V, 36V, 45V, or 48V.

7. The system as claimed in claim 1, wherein the distinct frequency is 10 kHz, the set of distinct frequencies is 5 kHz, 10 kHz, and 20 kHz, and the frequency range is 10 kHz to 20 kHz.

* * * * *